(12) United States Patent
Chen et al.

(10) Patent No.: US 10,506,405 B2
(45) Date of Patent: Dec. 10, 2019

(54) CONNECTION SYSTEM, CONNECTING METHOD, AND CONNECTION DEVICE

(71) Applicant: HTC Corporation, Taoyuan (TW)

(72) Inventors: Chia-Wei Chen, Taoyuan (TW);
Cheng-Kang Lin, Taoyuan (TW);
Cheng-Yu Chung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 144 days.

(21) Appl. No.: 15/470,887

(22) Filed: Mar. 27, 2017

(65) Prior Publication Data

US 2018/0097689 A1    Apr. 5, 2018

Related U.S. Application Data

(60) Provisional application No. 62/404,226, filed on Oct. 5, 2016.

(51) Int. Cl.
*H04L 29/06* (2006.01)
*H04W 8/00* (2009.01)
(Continued)

(52) U.S. Cl.
CPC ........... *H04W 4/80* (2018.02); *H04L 65/4076* (2013.01); *H04W 8/005* (2013.01); *H04W 76/00* (2013.01);
(Continued)

(58) Field of Classification Search
CPC ............... H04W 76/023; H04W 4/008; H04W 72/0433; H04W 52/0235; H04W 8/005; H04W 84/12; H04W 76/14; H04W 12/02; H04W 4/80; H04W 12/06; H04W 4/00; H04W 84/18; H04W 12/04; H04W 12/08; H04W 4/14; H04W 76/00; H04L 63/0428; H04L 45/121; H04L 45/24; H04L 63/061; H04L 63/067; H04L 67/16; H04L 41/12; H04L 65/4076; H04L 67/02; H04L 41/0806; H04L 61/6022; H04L 63/0272; H04L 67/06; H04L 12/4633; H04L 12/4641; H04L 41/0893; H04L 63/0876; H04L 63/107; H04L 69/18; H04L 12/185;
(Continued)

(56) References Cited

U.S. PATENT DOCUMENTS

| | | | | |
|---|---|---|---|---|
| 9,258,695 | B2 * | 2/2016 | Kasslin ................. | H04W 8/005 |
| 2005/0058107 | A1 * | 3/2005 | Salokannel .......... | H04B 1/7183 |
| | | | | 370/338 |

(Continued)

*Primary Examiner* — Djenane M Bayard
(74) *Attorney, Agent, or Firm* — CKC & Partners Co., LLC (57) ABSTRACT

A connecting method includes broadcasting, through a first transmission component of a first connection device, a device name of the first connection device and an address of the first connection device; transmitting, through a second transmission component of the first connection device, identification information of the first connection device to a second connection device; performing, through the second connection device, a scanning procedure to acquire the device name and the address of the first connection device; and building, through the second connection device, a connection with the first connection device according to the identification information of the first connection device, the device name of the first connection device, and the address of the first connection device.

20 Claims, 6 Drawing Sheets

(51) Int. Cl.
    *H04W 4/80*         (2018.01)
    *H04W 76/00*       (2018.01)
    *H04L 12/24*        (2006.01)
    *H04L 29/12*        (2006.01)

(52) U.S. Cl.
    CPC ........ *H04L 41/0886* (2013.01); *H04L 61/103* (2013.01); *H04L 61/6081* (2013.01)

(58) Field of Classification Search
    CPC . H04L 12/1886; H04L 29/08; H04L 41/0816; H04L 61/6081; H04L 63/083; H04L 63/18; H04L 67/104; H04L 67/1095; H04L 67/34; H04L 9/0631; H04L 12/1836; H04L 12/1877; H04L 12/28
    See application file for complete search history.

(56) References Cited

U.S. PATENT DOCUMENTS

| | | | | |
|---|---|---|---|---|
| 2010/0317289 A1* | 12/2010 | Desai | ................... | H04B 17/318 455/41.2 |
| 2013/0254050 A1* | 9/2013 | Zhu | ................... | G06Q 20/20 705/20 |
| 2014/0342670 A1* | 11/2014 | Kang | ................... | H04W 24/08 455/41.2 |
| 2016/0050326 A1* | 2/2016 | Lee | ................... | H04N 21/2223 358/402 |
| 2016/0127600 A1* | 5/2016 | Beatty | ................. | G07G 1/0018 358/1.15 |

\* cited by examiner

Fig. 6

CONNECTION SYSTEM, CONNECTING METHOD, AND CONNECTION DEVICE

RELATED APPLICATIONS

This application claims priority to U.S. Provisional Application Ser. No. 62/404,226, filed Oct. 5, 2016, which is herein incorporated by reference.

BACKGROUND

Technical Field

The present disclosure relates to a system, a method, and an electronic device. More particularly, the present disclosure relates to a connection system, a connecting method, and a connection device.

Description of Related Art

With advances in electronic technology, electronic devices are being increasingly used.

A typical connection device may search connectable devices within a communication range of itself. After all of the connectable devices within the communication range of the connection device are searched, a user may select one of the searched devices, and make to the connection device to build a connection between the selected device and the connection device. However, it takes time to search the connectable devices, and thus causing inconvenience to the user.

SUMMARY

One aspect of the present disclosure is related to a system. In accordance with one embodiment of the present disclosure, the system includes a first connection device, a receiver, and a second connection device. The first connection device includes a first transmission component and a second transmission component. The first transmission component is configured for broadcasting a device name of the first connection device and an address of the first connection device. The receiver is configured for receiving identification information of the first connection device from the second transmission component of the first connection device. The second connection device is configured for receiving the identification information from the receiver; performing a scanning procedure to acquire the device name of the first connection device and the address of the first connection device; and building a connection between the first connection device and the second connection device according to the identification information of the first connection device, the device name of the first connection device, and the address of the first connection device.

Another aspect of the present disclosure is related to a method. In accordance with one embodiment of the present disclosure, the method includes broadcasting, through a first transmission component of a first connection device, a device name of the first connection device and an address of the first connection device; transmitting, through a second transmission component of the first connection device, identification information of the first connection device to a second connection device; performing, through the second connection device, a scanning procedure to acquire the device name and the address of the first connection device; and building, through the second connection device, a connection with the first connection device according to the identification information of the first connection device, the device name of the first connection device, and the address of the first connection device.

Another aspect of the present disclosure is related to a device. In accordance with one embodiment of the present disclosure, the device includes a communication component, one or more processing components electrically connected to the communication component, memory electrically connected to the one or more processing components, and one or more programs. The one or more programs are stored in the memory and configured to be executed by the one or more processing components. The one or more programs includes instructions for controlling the communication component for performing a scanning procedure to acquire device names and addresses of external devices within a communication range of the communication component; receiving identification information of one of the external devices via a receiver electrically connected to the connection device; and controlling the communication component for building a connection with the one of the external devices according to the identification information of the one of the external devices, the device names of the external devices, and the addresses of the external devices.

Through the operations of one embodiment described above, the second connection device can directly connect to the first connection device according to the identification information of the first connection device, so that efficiency of connecting the first connection device and the second connection device can be increased.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
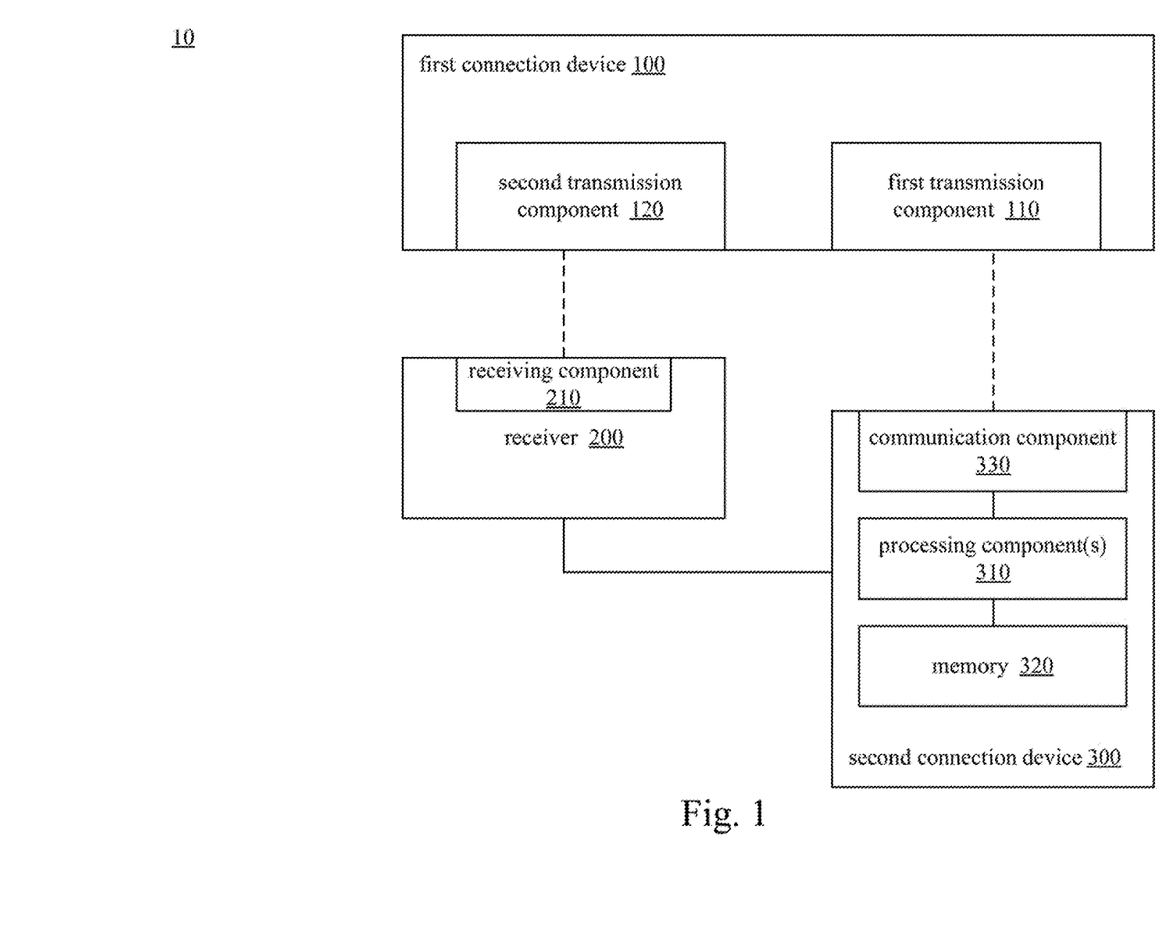
FIG. 1 is a schematic block diagram of a connection system in accordance with one embodiment of the present disclosure.

FIG. 1 is a schematic block diagram of a connection system 10 in accordance with one embodiment of the present disclosure. In this embodiment, the connection system 10 includes a first connection device 100, a receiver 200, and a second connection device 300. In one embodiment, the first connection device 100 may communicate with the receiver 200 via a wired or wireless connection. In one embodiment, the first connection device 100 may communicate with the second connection device 300 via a wireless connection. In one embodiment, the second connection device 300 may communicate with the receiver 200 via wired or wireless connection.

In one embodiment, the first connection device 100 may provide identification information of itself (e.g., a serial number) to the receiver 200. The receiver 200 may provide the identification information of the first connection device 100 to the second connection device 300, so that when the second connection device 300 performs a scanning procedure and acquire device names and address of devices within the communication range of the second connection device 300, the second connection device 300 can rapidly find the first connection device 100 and build a connection with the first connection device 100 according to the identification information.

In one embodiment, the first connection device 100 includes a first transmission component 110 and a second transmission component 120. In one embodiment, the first transmission component 110 is configured to broadcast the device information of the first connection device 100 or the first transmission component 110. In one embodiment, the second transmission component 120 is configured to transmit identification information of the first connection device 100 to the receiver. In one embodiment the identification information of the first connection device 100 is partially or completely identical to the device name of the first connection device 100.

In one embodiment, the first transmission component 110 may use a first communication technology to transmit data, and the second transmission component 120 may use a second communication technology different from the first communication technology to transmit data, but the present disclosure is not limited in this regard. In one embodiment, the first transmission component 110 may be a bluetooth transmission component, a bluetooth low energy (BLE) transmission component, or another suitable transmission component, but the present disclosure is not limited in this regard. In one embodiment, the second transmission component 120 may be a short-distance transmission component. In one embodiment, the second transmission component 120 may be an infrared radiation transmission component. In one embodiment, the second transmission component 120 may be a near field communication (NFC) transmission component. In one embodiment, the second transmission component 120 may be a transmission component using a cable or an attachable storage (e.g., a USB transmission component). In one embodiment, the identification information transmitted from the second transmission component 120 is transmitted by a signal with a low penetrating ability that is unable to penetrate a wall. In such a configuration, the identification information will not be received by another device located in a different space.

In addition, in an alternative embodiment, the second transmission component 120 may be a display to display an image corresponding to identification information (e.g., a QR code or a bar code) or a signal generator (e.g., a LED) to display serious data corresponding to identification information that can be identified by the receiver 200.

In one embodiment, the receiver 200 includes a receiving component 210. In one embodiment, the receiving component 210 corresponds to the second transmission component 120 of the first connection device 100 (i.e., the receiving component 210 and the second transmission component 120 use identical or compatible communication technology), so as to receive the identification information transmitted from the second transmission component 120. In one embodiment, the receiving component 210 may be a short-distance receiving component. In one embodiment, receiving component 210 may be an infrared radiation receiving component. In one embodiment, the receiving component 210 may be a near field communication (NFC) receiving component. In one embodiment, the receiving component 210 may be a receiving component using a cable or an attachable storage (e.g., a USB receiving component).

In addition, in an alternative embodiment, the receiving component 210 may include a camera and an identifier, so as to capture the image corresponding to identification information and identify the identification information from the image. In another embodiment, the receiving component 210 may include a scanner to scan the image corresponding to identification information to acquire the identification information from the image. In another embodiment, the receiving component 210 may include a signal receiver (e.g., an optical receiver) that can receive the displayed serious data corresponding to identification information from the second transmission component 120, to acquire the identification information the serious data.

In one embodiment, the second connection device 300 includes one or more processing components 310, a memory 320, and a communication component 330. In one embodiment, the one or more processing components 310 are electrically connected to the memory 320 and the communication component 330. In one embodiment, the communication component 330 corresponds to the first transmission component 110 (i.e., the communication component 330 and the first transmission component 110 use identical or compatible communication technology), so as to receive the device name and the address broadcasted from the first transmission component 110. In one embodiment, the communication component 330 may be a bluetooth communication component, a bluetooth low energy (BLE) communication component, or another suitable communication component, but the present disclosure is not limited in this regard.

In one embodiment, the one or more processing components 310 can be realized by, for example, one or more processors, such as central processors and/or microprocessors, but are not limited in this regard. In one embodiment, the memory 320 includes one or more memory devices, each of which comprises, or a plurality of which collectively comprise a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this invention pertains.

In one embodiment, the first transmission component 110, the second transmission component 120, the receiving component 210, and the communication component 330 may be realized by, for example, circuits, but are not limited in this regard.

In one embodiment, the first connection device 100 may run or execute various software programs and/or sets of instructions stored in storage media of the first connection device 100 to perform various functions for the first connection device 100 and to process data. In one embodiment, the receiver 200 may run or execute various software programs and/or sets of instructions stored in storage media of the receiver 200 to perform various functions for the receiver 200 and to process data. In one embodiment, the one or more processing components 310 may run or execute various software programs and/or sets of instructions stored in memory 320 to perform various functions for the second connection device 300 and to process data.

In one embodiment, the first connection device 100 may control the first transmission component 110 to broadcast the device information of the first connection device 100 or the first transmission component 110 by using the first communication technology. In one embodiment, the device information may include the device name, the address, and/or another unique information of the first connection device 100 or the first transmission component 110. In one embodiment, the device information of the first connection device 100 or the first transmission component 110 may include a Bluetooth device address or BLE device address of the first connection device 100 or the first transmission component 110. Additionally, the first connection device 100 may control the second transmission component 120 to transmit identification information of the first connection device 100 to the receiver 200 by using the second communication technology.

The receiver 200 may use the receiving component 210 to receive the identification information of the first connection device 100 transmitted by the second transmission component 120 by using the second communication technology. Subsequently, the receiver 200 may transmit the identification information of the first connection device 100 to the second connection device 300 in a format that is readable by the second connection device 300.

The one or more processing components 310 of the second connection device 300 can receive the identification information of the first connection device 100 from the receiver 200. Additionally, the one or more processing components 310 of the second connection device 300 can control the communication component 330 to perform a scanning procedure to scan a communication channel by using the first communication technology to acquire device names and addresses of devices within the communication range of first transmission component 110, in which the acquired device names and addresses include the device name and the address of the first connection device 100. Subsequently, the one or more processing components 310 of the second connection device 300 can control the communication component 330 to build a connection by using the first communication technology with one of the devices according to the identification information and the acquired device names and addresses. More specifically, the one or more processing components 310 of the second connection device 300 can control the communication component 330 to build a connection with one of the devices according to the address of the one of the devices in response to the fact that the device name of the one of the devices corresponds to the identification information. In this case, the communication component 330 builds a connection with the first connection device 100 according to the address of the first connection device 100.

Through such a configuration, the second connection device 300 can build a connection with a target device according to the identification information before the scanning procedure is completed, so that the connection can be built rapidly.

In some approaches, the second connection device 300 may illustrate all of the device names after the scanning procedure is completed, so as to allow the user to select a device to build a connection. However, in such a configuration, it takes time to complete the scanning procedure and the user has to recognize the device name of the target device.

However, in one embodiment of the present disclosure, since the second connection device 300 acquires the identification information of the target device (i.e., the first connection device 100) in advance, the second connection device 300 can build a connection with the target device as soon as the device name of the target device corresponding to the identification information is acquired (that is, it does not need to wait until the scanning procedure is completed), so that the efficiency of building the connection can be increased. Additionally, the second connection device 300 can automatically build a connection with the target device according to the identification information without manually selection.

In some approaches, the first connection device may broadcast its device name completely identical to the identification information (e.g., broadcast its serial number).

However, in such a manner, other devices can easily connect to the first connection device, and more security risks may be caused.

However, in one embodiment of the present disclosure, the first connection device 100 may shield a portion of its identification information to generate the device name, so that the broadcasted device name is partially identical to the identification information and partially different from the identification information. In such a manner, other devices are not able to get the identification information of the first connection device 100, thus increasing security.

In one embodiment, the one or more processing components 310 of the second connection device 300 may terminate the scanning procedure as soon as the device name corresponding to the identification information of the first connection device is acquired.

In such a configuration, unnecessary operations in the scanning procedure after the device name corresponding to the identification information of the target device (i.e., the first connection device 100) being acquired can be omitted.

Figure 2:
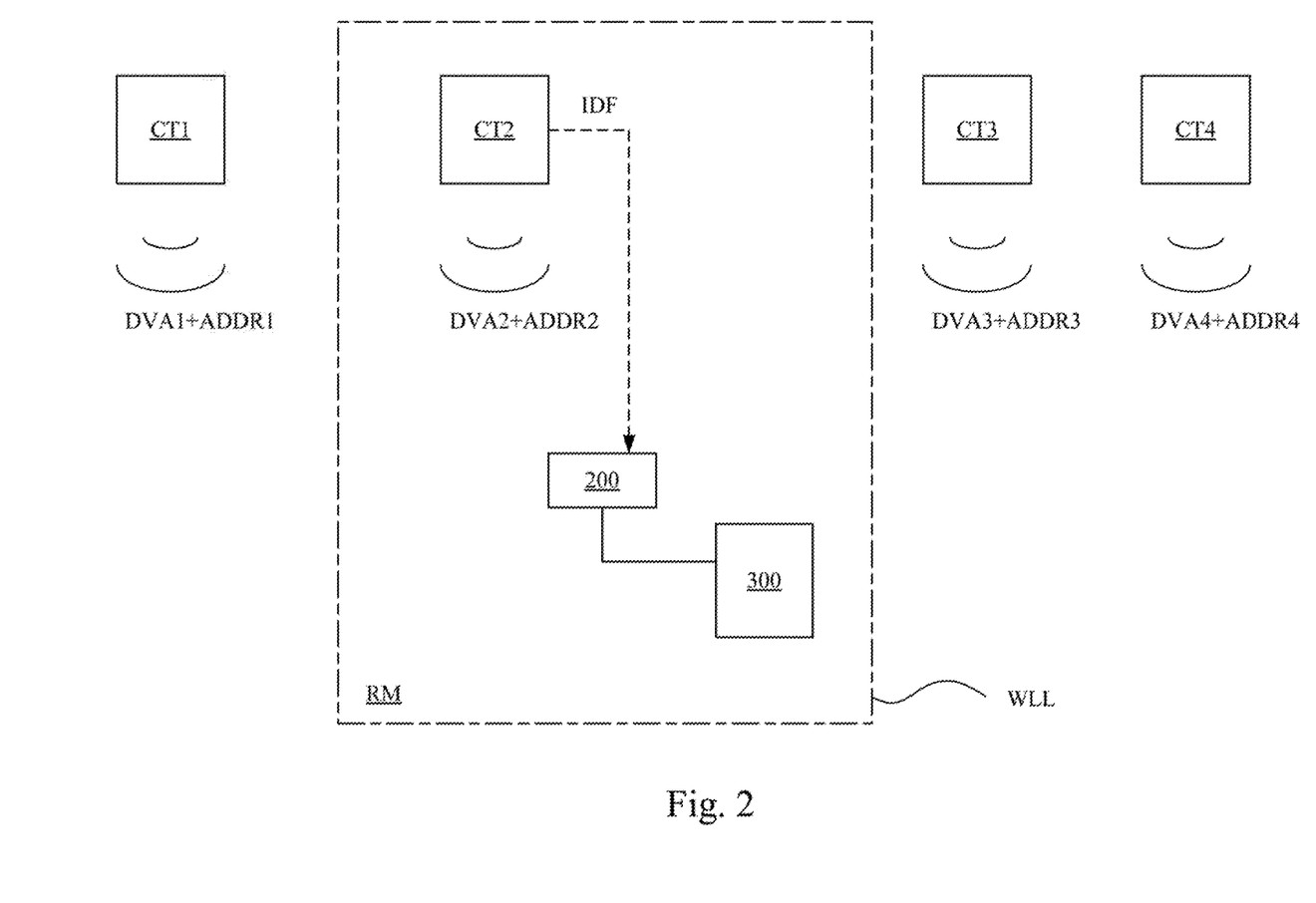
FIG. 2 illustrates an illustrative example of the connection system in accordance with one embodiment of the present disclosure.

To allow the disclosure to be more fully understood, an illustrative example with reference to FIG. 2 is described in the paragraphs below, but the present disclosure is not limited to the example below.

In this illustrative example, the connection device CT2, the receiver 200, and the second connection device 300 are within the same space RM (e.g., a room) surrounding by walls WLL. In this illustrative example, the connection devices CT1-CT4 broadcast their device names DVA1-DVA4 and addresses ADDR1-ADDR4. For example, the connection device CT1 broadcast its device name DVA1 (e.g., ABC123) and address ADDR1. The connection device CT2 broadcast its device name DVA2 (e.g., HTC931) and address ADDR2. The connection device CT3 broadcast its device name DVA3 (e.g., HTC111) and address ADDR3. The connection device CT4 broadcast its device name DVA4 (e.g., ABC783) and address ADDR4.

In this illustrative example, the connection device CT2 can transmit its identification information to the receiver 200. The identification information may be, for example, the serial number (e.g., 02786931) of the connection device CT2. In this illustrative example, since the connection devices CT1, CT3, CT4 are located outside the space RM, and the identification information from the connection devices CT1, CT3, CT4 are not able to penetrate the wall WLL, the receiver 200 does not receive the identification information from the connection devices CT1, CT3, CT4. Similarly, the identification information of the connection device CT2 will not be received by another device outside the space RM.

In this illustrative example, the second connection device 300 can perform a scanning procedure to scan the corresponding channel to sequentially acquire the device names and the addresses of the connection devices CT1-CT4. For example, at first, the second connection device 300 acquire the device name DVA1 (e.g., ABC123) and address ADDR1 of the connection devices CT1. The second connection device 300 compares the identification information (e.g., 02786931) received by the receiver 200 with the device name DVA1 (e.g., ABC123), and finds that the device name DVA1 does not correspond to the identification information. Accordingly, the second connection device 300 does not build a connection with the connection device CT1.

Subsequently, the second connection device 300 continues to scan the channel to acquire the device name DVA2 (e.g., HTC931) and address ADDR2 of the connection devices CT2. The second connection device 300 compares the identification information (e.g., 02786931) received by the receiver 200 and the device name DVA2 (e.g., HTC931), and finds that the device name DVA2 corresponds to the identification information (e.g., the last 3 digits are identical). Accordingly, the second connection device 300 builds a connection with the connection device CT2 according to the ADDR2. Additionally, because it does not need to acquire other device names and addresses, the second connection device 300 terminates the scanning procedure.

In an alternative example, after the second connection device 300 receive the identification information of the connection device CT2, the second connection device 300 may generate a target name according to a predetermined rule. For example, the second connection device 300 may combine the word "HTC" to the last 3 digits of the identification information "931" to generate the target name "HTC931". After that, the second connection device 300 can determine whether to build a connection according to the fact that whether the acquired device name is identical to the target name.

Details of the present disclosure are described in the paragraphs below with reference to a connecting method in FIG. 3. However, the present disclosure is not limited to the embodiment below.

It should be noted that the method can be applied to a connection system having a structure that is the same as or similar to the structure of the connection system 10 shown in FIG. 1. To simplify the description below, the embodiment shown in FIG. 1 will be used as an example to describe the method according to an embodiment of the present disclosure. However, the present disclosure is not limited to application to the embodiment shown in FIG. 1.

Figure 3:
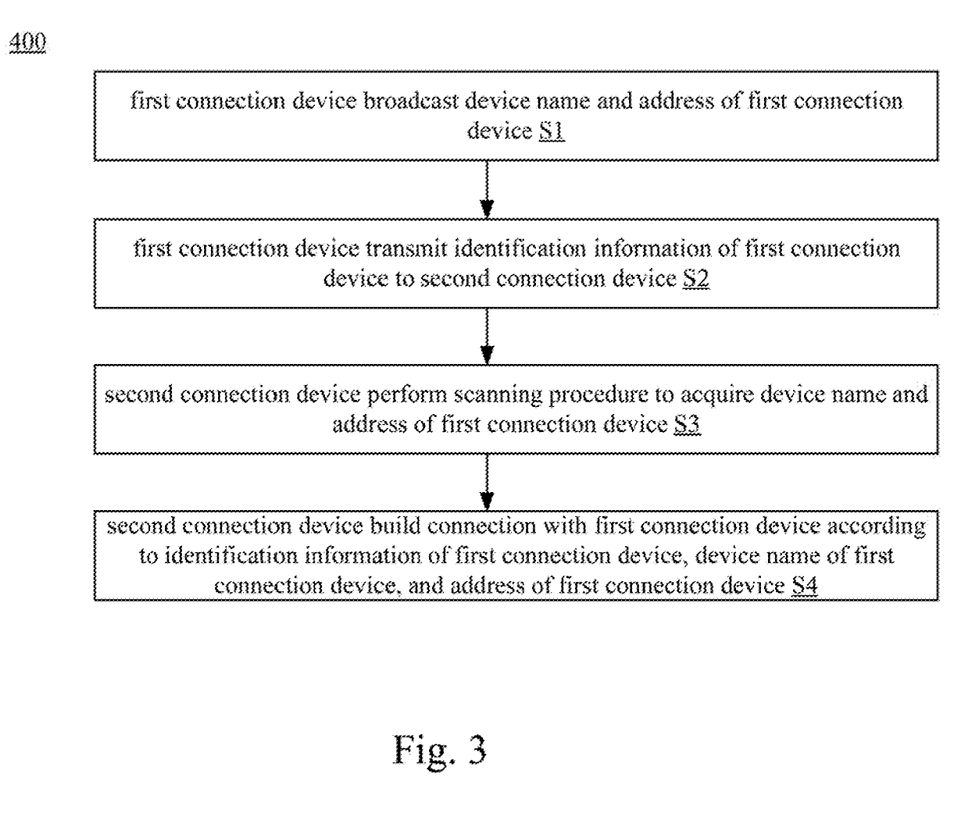
FIG. 3 is a flowchart of a method in accordance with one embodiment of the present disclosure.

Reference is made to FIGS. 1 and 3. The method 400 includes the operations below.

In operation S1, the first connection device 100 controls the first transmission component 110 to broadcast the device information of the first connection device 100 or the first transmission component 110.

In operation S2, the first connection device 100 controls the second transmission component 120 to transmit identification information of the first connection device 100 to the second connection device 300 via the receiver 200.

In operation S3, the one or more processing components 310 of the second connection device 300 control the communication component 330 to perform a scanning procedure to acquire the device name and the address of the first connection device 100.

In operation S4, the one or more processing components 310 of the second connection device 300 control the communication component 330 to build a connection with the first connection device 100 according to the identification information of the first connection device 100, the device name of the first connection device 100, and the address of the first connection device 100.

Details of the operations S1-S4 can be ascertained with reference to paragraphs above, and a description in this regard will not be repeated herein.

In the paragraphs below, details of the present disclosure are described with reference to a method of a connection device in FIG. 4. However, the present disclosure is not limited to the embodiment below.

It should be noted that the method can be applied to a connection device having a structure that is the same as or similar to the structure of the second connection device 300 shown in FIG. 1. To simplify the description below, the embodiment shown in FIG. 1 will be used as an example to describe the method according to an embodiment of the present disclosure. However, the present disclosure is not limited to application to the embodiment shown in FIG. 1.

Figure 4:
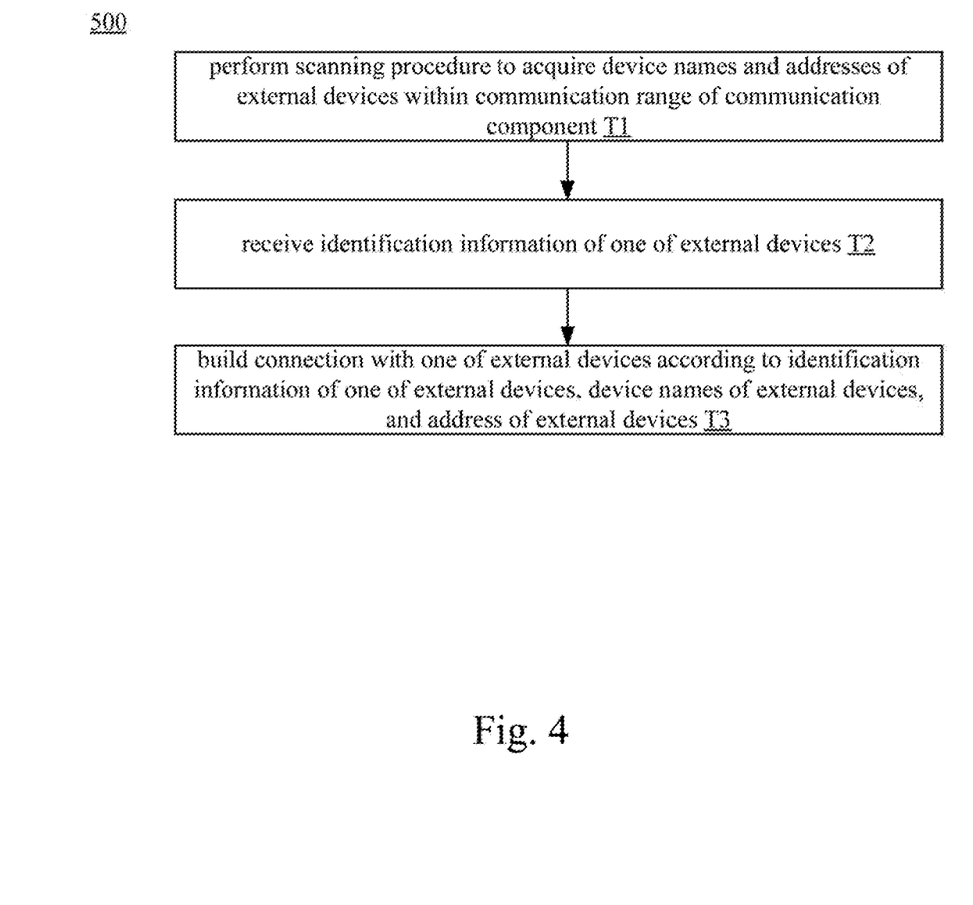
FIG. 4 is a flowchart of a method in accordance with one embodiment of the present disclosure.

Reference is made to FIGS. 1 and 4. The method 500 includes the operations below.

In operation T1, the one or more processing components 310 of the second connection device 300 control the communication component 330 to perform a scanning procedure to acquire device names and addresses of external devices (e.g., including the device name and the address of the first connection device 100) within a communication range of the communication component 330.

In operation T2, the one or more processing components 310 of the second connection device 300 receive identification information of one of the external devices (e.g., the first connection device 100) via a receiver 200 electrically connected to the second connection device 300.

In operation T3, the one or more processing components 310 of the second connection device 300 control the communication component 330 to build a connection with the one of the external devices (e.g., the first connection device 100) according to the identification information of the one of the external devices, the device names of the external devices, and the address of the external devices.

Details of the operations T1-T3 can be ascertained with reference to paragraphs above, and a description in this regard will not be repeated herein.

It should be noted that, in some embodiments, each of the methods 400, 500 described above may be implemented as a computer program. When the computer program is executed by a computer, an electronic device, or one or more processors, this executing device performs the method 400 or the method 500. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the methods described above, no particular sequence is required unless otherwise specified. Moreover, the operations of the methods described above also may be performed simultaneously or the execution times thereof may at least partially overlap.

Furthermore, the operations of the method described above may be added to, replaced, and/or eliminated as appropriate, in accordance with various embodiments of the present disclosure.

Figure 5:
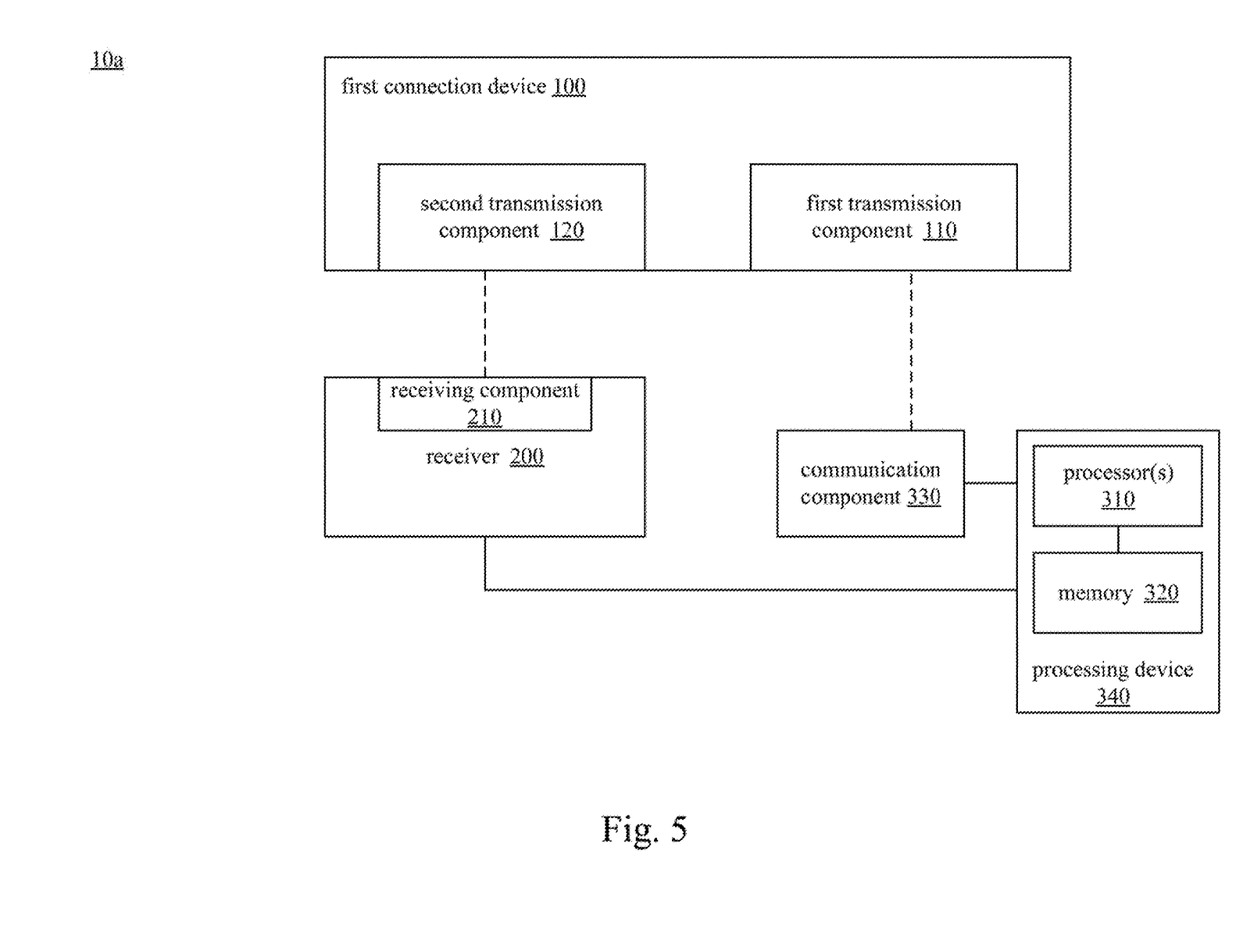
FIG. 5 is a schematic block diagram of a connection system in accordance with another embodiment of the present disclosure.

Reference is made to FIG. 5. FIG. 5 is a schematic block diagram of a connection system 10a in accordance with another embodiment of the present disclosure. In this embodiment, the connection system 10a is substantially identical to the system 10, and a description of many aspects that are similar will not be repeated.

In this embodiment, the connection system 10a includes the first connection device 100 described above, the receiver 200 described above, the communication component 330 described above, and a processing device 340 that include the one or more processing components 310 and the memory 320 described above. That is, in this embodiment, the second connection device 300 in the connection system is divided into two separate devices.

In this embodiment, the connection system 10a may be realized by using, for example, a HTC Vive system. For example, the first connection device 100 may be realized by using a Vive light house, the receiver 200 may be realized by using an infrared radiation receiver disposed on a Vive helmet device, the communication component 330 may be realized by using a Vive link box, and the processing device 340 may be realized by using a computer (e.g., a desktop or a laptop).

In this embodiment, the first connection device 100 can emit infrared rays to both position the receiver 200 and provide the identification information mentioned above to the receiver 200. The receiver 200 can receive the infrared rays, acquire the identification information from the infrared rays, and provide the identification information to the processing device 340.

Additionally, the first connection device 100 can broadcast its device name and address (e.g. Bluetooth device address or BLE device address) by using bluetooth signals or BLE signals. The processing device 340 can control the communication component 330 to perform the scanning procedure to scan the bluetooth channel or the BLE channel and build a bluetooth connection or a BLE connection according to the identification information.

Details of this embodiment can be ascertained with reference to the paragraphs above, and a description in this regard will not be repeated herein.

Figure 6:
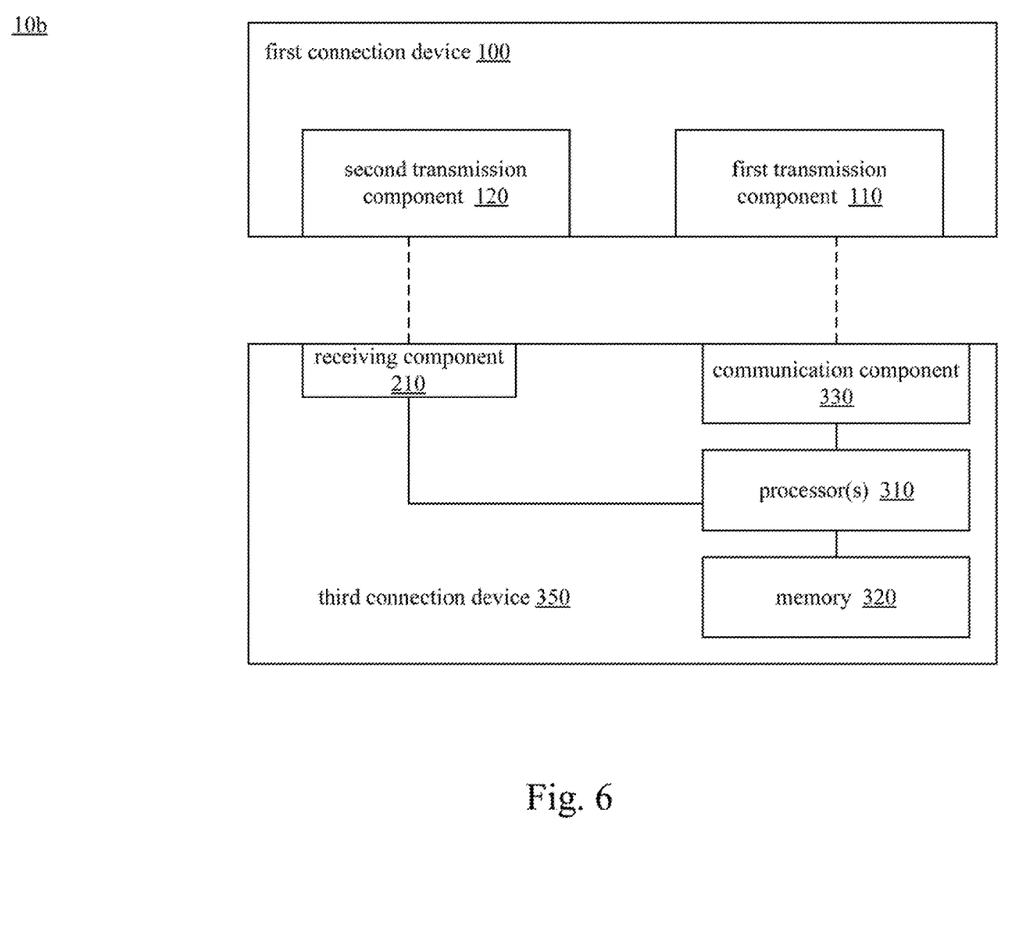
FIG. 6 is a schematic block diagram of a connection system in accordance with another embodiment of the present disclosure.

Reference is made to FIG. 6. FIG. 6 is a schematic block diagram of a connection system 10b in accordance with another embodiment of the present disclosure. In this embodiment, the connection system 10b is substantially identical to the system 10, and a description of many aspects that are similar will not be repeated.

In this embodiment, the connection system 10b includes the first connection device 100 described above, and a third connection device 350 that includes the receiving component 210 described above, the communication component 330 described above, the one or more processing components 310 described above, and the memory 320 described above. That is, in this embodiment, the receiver 200 described above and the second connection device 300 described above are integrated together.

In this embodiment, the third connection device 350 may be realized by using, for example, a Samsung Gear VR headset. In this embodiment, the first connection device 100 can transmit the identification information mentioned above to the receiving component 210 via a connecting cable, NFC signals, infrared radiation signals, or an attachable storage. The receiving component 210 can receive the identification information and transmit the identification information to the one or more processing components 310. The one or more processing components 310 can control the communication component 330 to perform the scanning procedure and build a connection according to the identification information.

In an alternative embodiment, the first connection device 100 may display a QR code or a barcode corresponding to the identification information to transmit the identification information mentioned above. The receiving component 210 can capture the QR code or the barcode and acquire the identification information according to the captured QR code or barcode.

Details of this embodiment can be ascertained with reference to the paragraphs above, and a description in this regard will not be repeated herein.

Although the present invention has been described in considerable detail with reference to certain embodiments thereof, other embodiments are possible. Therefore, the scope of the appended claims should not be limited to the description of the embodiments contained herein.

What is claimed is:

1. A system comprising:
a first connection device comprising:
a first transmission circuit configured for broadcasting a device name including a partial identification information of the first connection device and an address of the first connection device; and
a second transmission circuit configured for transmitting a full identification information of the first connection device, wherein the partial identification information is identical to a part of the full identification information;
a receiver comprising a receiving circuit configured for receiving the full identification information of the first connection device from the second transmission circuit of the first connection device; and
a second connection device comprising a first communication circuit and a second communication circuit, wherein the first communication circuit is configured for receiving the full identification information from the receiver, and the second connection device is configured for:
performing a scanning procedure to acquire the device name including the partial identification information of the first connection device and the address of the first connection device from the second communication circuit; and
in response to the fact that the received full identification information of the first connection device corresponds to the acquired device name including at least the partial identification information of the first connection device, building a connection between the first connection device and the second connection device according to the address of the first connection device.

2. The system as claimed in claim 1, wherein the second connection device is configured for:
terminating the scanning procedure as soon as the device name including the partial identification information of the first connection device corresponding to the received full identification information of the first connection device is acquired.

3. The system as claimed in claim 1, wherein the second transmission circuit is a short-distance transmission circuit, and the receiver is a short-distance receiver.

4. The system as claimed in claim 3, wherein the second transmission circuit is an infrared radiation transmission circuit, and the receiver is an infrared radiation receiver.

5. The system as claimed in claim 1, wherein the full identification information transmitted from the second transmission circuit is transmitted by a signal with a low penetrating ability that is unable to penetrate a wall.

6. The system as claimed in claim 1, wherein the first transmission circuit is a bluetooth transmission circuit or a bluetooth low energy (BLE) transmission circuit.

7. The system as claimed in claim 1, wherein the receiver and the second connection device are an integrated device.

8. The system as claimed in claim 1, wherein the partial identification information and the full identification information are respectively a partial serial number and a full serial number.

9. A method comprising:
broadcasting, through a first transmission circuit of a first connection device, a device name including a partial identification information of the first connection device and an address of the first connection device;
transmitting, through a second transmission circuit of the first connection device, a full identification information of the first connection device to a second connection device, wherein the partial identification information is identical to a part of the full identification information;
receiving the full identification information through a first communication circuit of the second connection device;
performing, through the second connection device, a scanning procedure to acquire the device name including the partial identification information and the address of the first connection device from a second communication circuit of the second connection device; and
in response to the fact that the received full identification information of the first connection device corresponds to the acquired device name including at least the partial identification information of the first connection device, building, through the second connection device, a connection with the first connection device according to the address of the first connection device.

10. The method as claimed in claim 9, wherein the operation of building a connection with the first connection device comprises:
terminating the scanning procedure as soon as the device name including the partial identification information of the first connection device corresponding to the received full identification information of the first connection device is acquired.

11. The method as claimed in claim 9, wherein the second transmission circuit is a short-distance transmission circuit.

12. The method as claimed in claim 9, wherein the second transmission circuit is an infrared radiation transmission circuit.

13. The method as claimed in claim 9, wherein the full identification information transmitted from the second transmission circuit is transmitted by a signal with a low penetrating ability that is unable to penetrate a wall.

14. The method as claimed in claim 9, wherein the first transmission circuit is a bluetooth transmission circuit or a bluetooth low energy (BLE) transmission circuit.

15. The method as claimed in claim 9, wherein the partial identification information and the full identification information are respectively a partial serial number and a full serial number.

16. A device comprising:
a first communication circuit electrically connected to a receiver;
a second communication circuit;
one or more processors electrically connected to the first communication circuit and the second communication circuit;
memory electrically connected to the one or more processors; and
one or more programs, wherein the one or more programs are stored in the memory and configured to be executed by the one or more processors, the one or more programs comprising instructions for:
performing a scanning procedure to acquire device names and addresses of external devices within a communication range of the second communication circuit, wherein each of the device names includes a partial identification information of a corresponding external device of the external devices, and wherein one of the partial identification information of the device names is identical to a part of a full identification information of one of the external devices; and controlling the first communication circuit to receive the full identification information of the one of the external devices via the receiver; and in response to the fact that the received full identification information of the one of the external devices corresponds to the acquired device name including at least the acquired partial identification information of the one of the external devices, controlling the communication circuit for building a connection with the one of the external devices according to the addresses of the external devices.

17. The device as claimed in claim 16, wherein the one or more programs further comprises the instructions for:

controlling the communication circuit for terminating the scanning procedure as soon as the device name including the partial identification information of the one of the external devices corresponding to the full identification information of the one of the external devices is acquired.

18. The device as claimed in claim 16, wherein the receiver is a short-distance receiver.

19. The device as claimed in claim 18, wherein the receiver is an infrared radiation receiver.

20. The device as claimed in claim 16, wherein the second communication circuit is a bluetooth transmission circuit or a bluetooth low energy (BLE) transmission circuit.

* * * * *